(12) United States Patent
Wissemborski et al.

(10) Patent No.: US 8,609,056 B2
(45) Date of Patent: *Dec. 17, 2013

(54) IRON(III) ORTHOPHOSPHATE FOR LI ION ACCUMULATORS

(75) Inventors: Ruediger Wissemborski, Gau-Algesheim (DE); Gunnar Buehler, Nickenich (DE); Joachim Markmann, Dorsheim (DE); David Kuemmet, Budenheim (DE)

(73) Assignee: Chemische Fabrik Budenheim KG, Budenheim (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/680,366

(22) PCT Filed: Oct. 6, 2008

(86) PCT No.: PCT/EP2008/063348
§ 371 (c)(1),
(2), (4) Date: Jan. 6, 2011

(87) PCT Pub. No.: WO2009/050055
PCT Pub. Date: Apr. 23, 2009

(65) Prior Publication Data
US 2011/0117003 A1    May 19, 2011

(30) Foreign Application Priority Data

Oct. 16, 2007   (DE) .................. 10 2007 049 757

(51) Int. Cl.
*C01G 49/00* (2006.01)
*C01B 25/26* (2006.01)

(52) U.S. Cl.
USPC ................. 423/311; 423/309; 423/140

(58) Field of Classification Search
USPC ......... 423/138, 140–142, 304, 305, 307, 309, 423/311, 632, 633
See application file for complete search history.

(56) References Cited

U.S. PATENT DOCUMENTS

| | | | | |
|---|---|---|---|---|
| 3,070,423 A | * | 12/1962 | Alexander et al. | 423/311 |
| 3,407,034 A | * | 10/1968 | Bennetch | 423/311 |
| 3,862,298 A | * | 1/1975 | Beltz et al. | 423/659 |
| 4,374,109 A | * | 2/1983 | Ruszala et al. | 423/311 |
| 7,285,260 B2 | | 10/2007 | Armand et al. | |
| 7,457,018 B2 | | 11/2008 | Armand et al. | |
| 7,690,387 B2 | | 4/2010 | Fournier et al. | |
| 2006/0090768 A1 | * | 5/2006 | Fournier et al. | 131/334 |

FOREIGN PATENT DOCUMENTS

| | | | |
|---|---|---|---|
| FR | 2815027 A1 | * | 4/2002 |
| JP | 57042562 A | * | 3/1982 |
| SU | 1549916 A1 | | 3/1990 |
| WO | 0230815 A1 | | 4/2002 |

OTHER PUBLICATIONS

Son et al, "Nanoparticle iron-phosphate anode material for Li-ion Battery", Appl. Phys. Lett. 85, 2004, pp. 5875-5877.*
Zaghib et al, "Structure and electrochemistry of FePO4*2H2O hydrate", Journal of Power Sources, 142, 2005, pp. 279-284.*
Masquelier et al, "Hydrated Iron Phosphates as 3V positive electrodes in rechargeable lithium batteries," 2002, Journal of the electrochemical society, 149 (8), pp. A1037-A1044.*
Reale, P. et al., "Synthesis and Thermal Behavior of Hydrated Iron(III) Phosphates of Interest as Positive Electrodes in Li Batteries", Chemistry of Materials, Bd., 15, Nr. 26, Dec. 4, 2003, Seiten 5051-5058, XP002523335 in der Anmeldung erwaehnt; C. Delacourt et al., Chem. Mater. 2003, 15, 5051-5058.
Chemical Abstracts, American Chemical Society, US, Bd. 113, Nr. 4, Jul. 23, 1990, XP000213215 ISSN: 0009-2258.
Gmelins Handbuch der anorganischen Chemie, Eisen Teil B, pp. 773 ff, 1931.
Zhicong Shi et al., Electrochemical and Solid State Letters 2005, 8, A396-A399.
Chemical Abstracts Service, Columbus, OH, US; Zheng, Jun-Chao et al., "Effect of pH Value on Performance of FePO4.cntdot.xH20 and LiFePO4 in Synthesis Process", XP002523299, 2008.
Chemical Abstracts Service, Columbus, OH, US; Wang, Zhi-Xing et al., "Preparation of Precursor of LiFePO4 and its Performance", XP002523300 Jan. 1, 2008.

* cited by examiner

*Primary Examiner* — Steven Bos
*Assistant Examiner* — Justin Bova
(74) *Attorney, Agent, or Firm* — Michael L. Dunn

(57) ABSTRACT

Iron(III) orthophosphate of the general formula FePO$_4$× nH$_2$O (n≤2.5), prepared by a process in which iron(II)-, iron (III)- or mixed iron(II, III) compounds selected from among hydroxides, oxides, oxidehydroxides, oxide hydrates, carbonates and hydroxidecarbonates are reacted with phosphoric acid having a concentration in the range from 5% to 50%, any iron(II) present after the reaction is converted into iron (III) by addition of an oxidant and solid iron(III) orthophosphate is separated off from the reaction mixture.

8 Claims, 2 Drawing Sheets

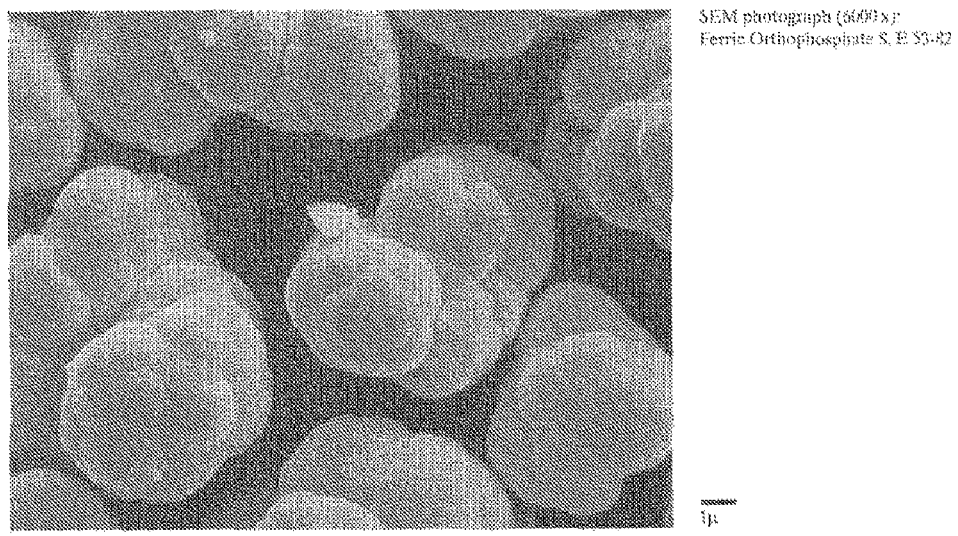
Figure 1a: A scanning electron micrograph of an iron(III) orthophosphate with metastrengite I crystal structure, prepared in accordance with a known prior art process from Fe(II)SO$_4$ with phosphoric acid.
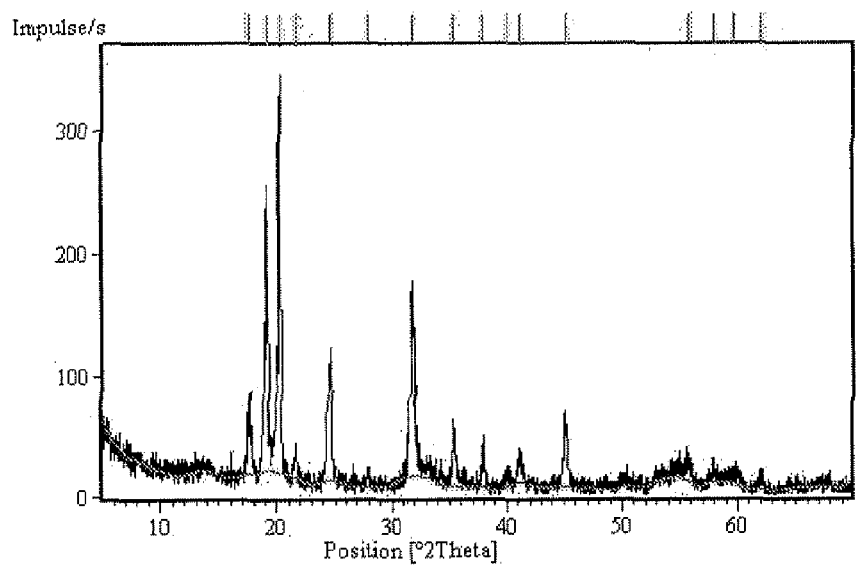
Figure 1b: XRD spectrum of the iron(III) orthophosphate of Figure 1a.

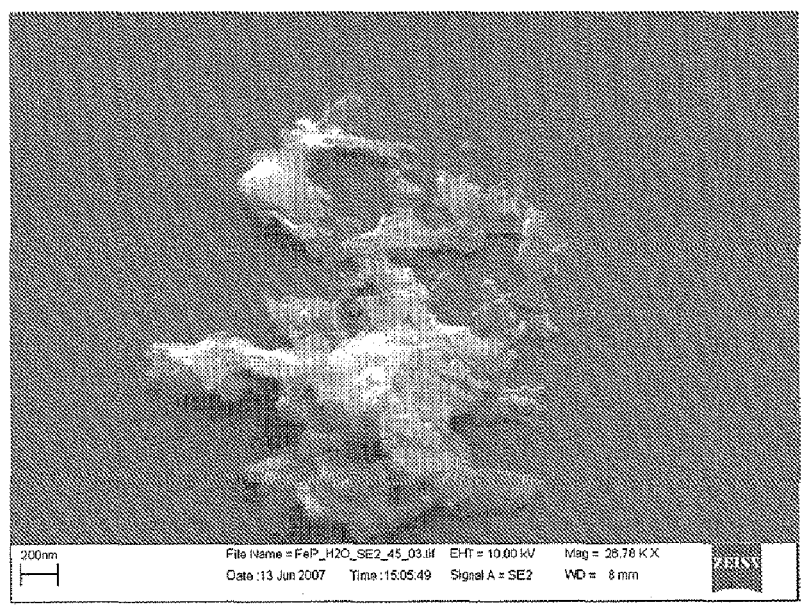
Figure 2a: A scanning electron micrograph of iron(III) orthophosphate according to the invention, prepared from FeO as described in Example 1, which is present predominantly in the metastrengite II crystal structure.
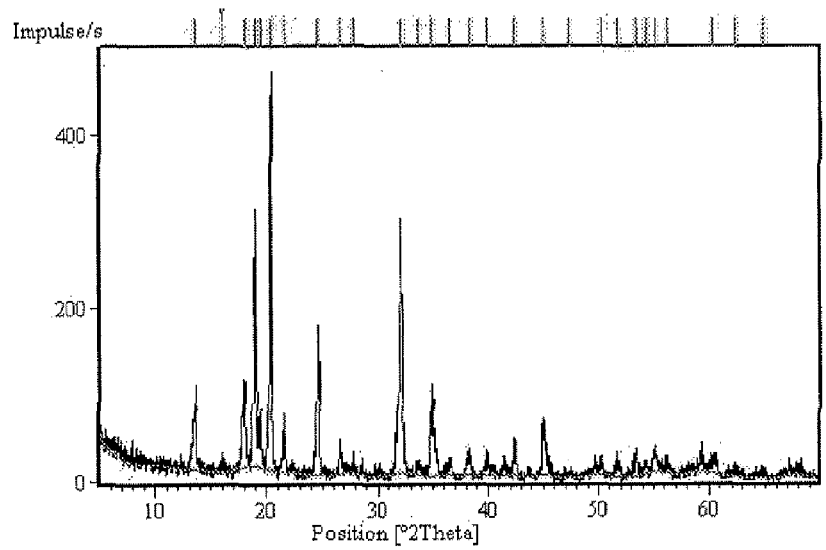
Figure 2b: shows an XRD spectrum for the iron(III) orthophosphate of Figure 2a.

IRON(III) ORTHOPHOSPHATE FOR LI ION ACCUMULATORS

CROSS REFERENCE TO RELATED APPLICATIONS

This claims priority from German Patent Application DE 102007049757.3 filed Oct. 16, 2007.

BACKGROUND OF THE INVENTION

The present invention relates to iron(III) orthophosphate, the production thereof and use thereof for the production of LiFePO$_4$ cathode material for Li ion accumulators.

Rechargeable Li ion accumulators are widespread energy accumulators, particularly within the mobile electronics domain, since the Li ion accumulator excels through its high energy density and can deliver a high nominal voltage of 3.7 volts, so that the Li ion accumulator is significantly smaller and lighter than conventional accumulators, but with comparable capacity. Spinels such as LiCoO$_2$, LiNiO$_2$, LiNi$_{1-x}$Co$_x$O$_2$ and LiMn$_n$O$_4$ have established themselves as cathode materials. In order to increase the safety of Li ion accumulators, above all in respect of thermal overload during operation, LiFePO$_4$ was developed as cathode material. This material excels through improved performance, higher specific capacitance and high thermal stability during operation.

High requirements in respect of purity are placed upon the cathode material of an accumulator, since any contamination which can give rise to undesirable redox reactions during operation (charging or discharging) has an adverse effect upon the performance of the accumulator. The type and concentration of possible contamination is essentially dependent upon the quality of the raw materials which are used to produce the cathode material. In the production process of the cathode material, steps can be taken to subsequently reduce impurities, but generally this is associated with an increase in production costs. It is therefore desirable to use starting materials or raw materials which are as pure as possible for producing the cathode material.

One starting material for producing LiFePO$_4$ for lithium ion accumulators is iron orthophosphate, the purity and structure or morphology of which have a significant influence upon the quality of the resulting cathode material.

Known processes for producing iron(III) orthophosphate use FeSO$_4$ and FeCl$_3$ as starting materials or raw materials, but also organometallic precursor compounds like FeC$_2$O$_2$ (Gmelins Handbuch der anorganischen Chemie, Eisen Teil B, pages 773 ff.; U.S. Pat. No. 3,407,034; C. Delacourt et al., Chem. Mater. 2003, 15, 5051-5058; Zhicong Shi et al., Electrochemical and Solid State Letters 2005, 8, A396-A399). The phosphorus or phosphate components in these starting materials are incorporated by a phosphate salt or phosphoric acid. In the processes described, additions of HCl, NaOH, NH$_3$, NaClO$_3$ or surfactants are always needed in order to control the chemical and physical properties of the products obtained. This means that the materials produced in this way always contain impurities of anions like chloride or sulphate, cations like sodium or ammonium, or organic components. On a large scale, these impurities can only, if at all, be removed by extremely expensive and cost-intensive purifying processes.

Other cationic contaminants, e.g. transition metals which were originally contained in the raw materials used, like FeSO$_4$ or FeCl$_3$, cannot generally be separated or washed out easily because as a rule they form phosphate salts which are not readily soluble, and usually crystallise with the desired iron phosphate.

WO 02/30815 describes a process for the production of LiFePO$_4$ from iron phosphate and lithium, wherein to produce the iron phosphate an iron oxide is dissolved in 85% phosphoric acid with heating. The solution is then diluted until the solubility limit of FePO$_4$ is reached and the material crystallises. By fractionated dilution, undesirable metal phosphates are intended to be separated off which have a smaller solubility product than FePO$_4$. This process has the drawback that it requires a very high energy input, and needs a lot of water for the product to precipitate. With this process, a soluble complex of iron forms which is stable for weeks and crystallises only slowly. This considerably reduces the economic yield of the product. By boiling the solution for several days it is possible to increase the yield, but a very large amount of energy is required. In addition, with this process, a large quantity of diluted phosphoric acid occurs which can only be re-used in the process after it has been concentrated. Therefore, the process is not worthwhile either from an economical or ecological viewpoint.

The prior art processes for producing iron phosphates have further drawbacks if the iron phosphate product obtained is intended for use in the production of LiFePO$_4$ for Li ion accumulators. Important factors with respect to the suitability of the material are the morphology and particle size distribution of the iron phosphates. The prior art processes of precipitating iron phosphate usually give rise to spherical crystals of varying size. However, they have a small surface area in comparison to other crystal morphologies. For use as cathode material in Li ion accumulators an iron phosphate with a large crystal surface is advantageous in order to guarantee that the lithium ions penetrate at high speed and in large numbers. Furthermore, it is advantageous to obtain crystals which are small in size in order to reduce the diffusion paths and diffusion times of the lithium ions. Also, a high bulk density and compressibility of the material is desirable so that a high energy storage density is given in the cathode material produced.

The aim of the present invention was therefore to create an iron phosphate and a process for the production thereof, wherein the drawbacks known from the prior art are overcome, and which has the afore-mentioned desirable properties.

BRIEF SUMMARY OF THE INVENTION

The problem of the present invention is solved by way of a process in which iron(II)-, iron(III)- or mixed iron(II, III)-compounds, selected from hydroxides, oxides, oxidehydroxides, oxide hydrates, carbonates and hydroxide carbonates, are reacted with phosphoric acid with a concentration in the range of 5% to 50%, any iron(II) present after the reaction is converted into iron(III) by addition of an oxidant, and solid iron(III) orthophosphate is separated off from the reaction mixture.

More particularly the invention is iron(III) orthophosphate of the general formula FePO$_4$×nH$_2$O (n≤2.5), produced by a process wherein iron(II), iron(III) or mixed iron(II, III) compounds selected from hydroxides, oxides, oxide hydroxides, oxide hydrates, carbonates and hydroxide carbonates, are reacted with phosphoric acid having a concentration in the range of 5% to 50%, any iron(II) present after the reaction is converted into iron(III) by addition of an oxidant, and solid iron(III) orthophosphate is separated from the reaction mixture.

The invention further includes iron(III) orthophosphate of the general formula $FePO_4 \times nH_2O$ (n 2.5) having an average particle size of less than 1 μm; a bulk density of at least 800 g/L; a sodium content, potassium content and sulphur content of <300 ppm each; wherein >80 wt. % of the iron(III) orthophosphate is present as a metastrengite II (phosphosiderite) crystal structure.

BRIEF DESCRIPTION OF THE SEVERAL VIEWS OF THE DRAWINGS

FIG. 1a shows a scanning electron micrograph of an iron (III) orthophosphate with metastrengite I crystal structure produced in accordance with a known prior art process from $Fe(II)SO_4$ with phosphoric acid.

FIG. 1b shows an XRD-spectrum of the iron(III) orthophosphate of FIG. 1a.

FIG. 2a shows a scanning electron micrograph of iron(III) orthophosphate according to the invention, produced from FeO according to Example 1, which is present predominantly in the metastrengite II crystal structure.

FIG. 2b shows an XRD spectrum of the iron(III) orthophosphate of FIG. 2a.

DETAILED DESCRIPTION OF THE INVENTION

In order to keep the yield of impurities low, an aqueous phosphoric acid solution is used of the highest possible purity.

In one embodiment of the invention, the iron(III) orthophosphate is in the form of platelet-shaped crystals. These crystals preferably have a small thickness within the range of a few hundred nanometers, preferably <300 nm, particularly preferably <200 nm, very preferably <100 nm. The dimensions of the platelet-shaped crystals in the two dimensions which are perpendicular to the thickness lie within the submicrometer range, preferably within the range of 200 to 1000 nm, particularly preferably 300 to 900 nm, very preferably 400 to 800 nm.

In the process according to the invention, the iron compounds used are mixed and reacted with the phosphoric acid directly as powdery raw materials. Alternatively, the iron compounds can also be freshly produced first of all by preliminary precipitation, and then be further processed as filter cakes, i.e. be mixed with phosphoric acid.

Depending upon the moisture content and type of raw material, phosphoric acids can be used here in different concentrations. According to the invention, a phosphoric acid is used in a concentration within the range of 5% to 50%. Lower concentrations do not give the desired reaction speeds of the iron compounds to iron orthophosphate. If the phosphoric acid concentration is too high, the desired iron orthophosphate remains in solution and does not crystallise out in an acceptable time, quantity and/or morphology.

In one preferred embodiment of the invention, the reaction of the iron compound with phosphoric acid is carried out with a phosphoric acid concentration within the range of about 8% to about 23%. This corresponds, with a pure phosphoric acid, to a density within the range of 1.042 g/l to 1.133 g/l.

By mixing the iron raw material with the phosphoric acid a suspension is initially obtained which is coloured or clouded by the proportion of solid matter of the raw material. In one embodiment of the invention, the suspension is then heated to a raised reaction temperature. In one embodiment of the invention, the reaction of the iron compounds with phosphoric acid is carried out at a temperature within the range of 50 to 180° C., preferably within the range of 60° C. to 150° C., particularly preferably within the range of 70° C. to 120° C.

The reaction of the iron compounds with phosphoric acid occurs within a relatively short time. In one embodiment of the invention, the reaction of the iron compounds with phosphoric acid is carried out for a period of from 0.5 min to 120 mins, preferably from 1 min to 60 mins, particularly preferably from 2 mins to 30 mins. The end of the reaction can be established by a colour change taking place to a pale yellow to pink shade.

In one embodiment of the invention, the reaction of the iron compound with phosphoric acid is carried out with thorough mixing of the starting materials of the reaction, preferably with agitation. To do this, any mixers and agitators known within the domain can be used which are suitable for such an application. Advantageously, it is also possible to use jet mixers, homogenisers, flow reaction cells etc. for thorough mixing and/or movement of the reaction starting materials.

The iron(III) orthophosphate according to the invention is produced by using iron(II), iron(III) or mixed iron(II,III) compounds as starting materials. Depending upon which one of these compounds has been used in what quantity, the reaction mixture contains more or less iron(II) following the reaction with phosphoric acid. According to the invention, this is converted into iron(III) by the addition of an oxidant. The oxidation of iron(II) into iron(III) can be carried out with any suitable oxidant. In one embodiment of the invention, the oxidation of any iron(II) which may be present is carried out by the addition of hydrogen peroxide ($H_2O_2$). In an alternative embodiment of the invention, oxidation is carried out by supplying air or oxygen in substantially pure form. In a further alternative embodiment of the invention, the oxidation is carried out by supplying ozone. Oxidation by adding a suitable oxidant is preferably carried out directly after the end of the reaction of the iron compounds with phosphoric acid. In the oxidation reaction, the temperature of the reaction mixture can be kept at, or close to, the temperature which was set previously for the reaction of the iron compounds with phosphoric acid. Alternatively, the oxidation reaction can be carried out after the reaction mixture has cooled to room temperature or below. However, the course of the oxidation reaction is usually easier and faster at increased temperature, and for this reason the oxidation reaction is preferably carried out at increased temperature.

The oxidation reaction is carried out until there is no iron (II), or virtually no iron(II), left which can be detected in the reaction mixture. The iron(III) orthophosphate is then separated off from the reaction mixture. In one embodiment of the invention, the iron(III) orthophosphate is separated off from the reaction mixture by filtration. In alternative embodiments of the invention, the iron(III) orthophosphate is separated from the reaction mixture by sedimentation, centrifuging, or by a combination of the afore-mentioned separation processes. Expediently, the iron(III) orthophosphate which is separated off from the reaction mixture is then dried at increased temperature and/or at reduced pressure. Alternatively, following separation, the iron(III) orthophosphate can also, advantageously, be further worked in damp form.

The process for producing the iron(III) orthophosphate according to the invention also has some ecological and economical advantages over other known processes for the production of iron(III) phosphates. The mother liquor which remains following separation of the iron(III) orthophosphate contains essentially no contaminating conversion products, such as for example, sulphates or chlorides, which remain behind in known prior art processes in which iron sulphate or iron chloride are used as starting materials. The mother liquor from the process according to the present invention can therefore be readjusted to the desired concentration by the addition of concentrated phosphoric acid, and can therefore be fully recycled in the process. This saves money and avoids undesirable waste.

The iron(III) orthophosphate according to the invention also differs structurally and with respect to its composition or impurities from iron(III) orthophosphate which has been produced according to prior art known processes. Amongst other things, the starting materials used contribute to this: iron(II), iron(III) and mixed iron(II, III) compounds which are selected from hydroxides, oxides, oxidehydroxides, oxide hydrates, carbonates and hydroxide carbonates, inter alia. Contrary to the present invention, known prior art processes for the production of iron(III) orthophosphate employ iron sulphate or sulphate-containing raw materials, amongst others, and the trend of the pH-value of the reaction is controlled by caustic soda solution. The iron phosphate products obtained therefore contain large residues of sulphate and sodium, which, in turn, have an adverse effect upon the performance of the $LiFePO_4$ cathode materials for Li ion accumulators produced from the iron phosphates.

In one embodiment of the present invention, the iron(III) orthophosphate therefore has a sulphur content of <300 ppm. In another embodiment of the present invention, the iron(III) orthophosphate nitrate content is <100 ppm. An excessive content of sulphur, mostly present in the form of sulphate, and an excessive nitrate content adversely affect the quality of a $LiFePO_4$ cathode material for Li ion accumulators produced from the iron(III) orthophosphate, since these anions produce undesirable redox reactions. In another embodiment of the invention, the iron(III) orthophosphate has respective sodium and potassium contents of <300 ppm. Sodium and potassium cations likewise have an adverse effect upon the quality of a $LiFePO_4$ cathode material produced from iron(III) orthophosphate, since they can occupy lithium positions.

The properties of the product according to the invention, namely of the iron(III) orthophosphate according to the invention are therefore significantly influenced by the process for their production and by the starting materials used for their production, and they differ from the iron(III) orthophosphate of the prior art.

Iron(III) orthophosphates produced from iron sulphate or iron chloride in accordance with generally known processes also have differences in respect of crystal structure. X-ray structural examinations have shown that iron(III) orthophosphate produced from iron sulphate or iron chloride according to the prior art is present predominantly in the metastrengite I-structure with small proportions of strengite and metastrengite II (phosphosiderite). On the other hand, X-ray structural examinations on iron(III) orthophosphates produced according to the invention have established that these latter are present predominantly in the metastrengite II structure (phosphosiderite) with very small or undetectable proportions of strengite and metastrengite I.

In one embodiment of the iron(III) orthophosphate according to the invention, >80 wt. %, preferably >90 wt. %, particularly preferably >95 wt. %, of the iron(III) orthophosphate is present in the metastrengite II (phosphosiderite) crystal structure.

The occurrence of the three afore-mentioned allotropic forms of iron(III) orthophosphate (metastrengite I, metastrengite II and strengite) is likewise described in the literature, as is the difficulty of producing a phase-pure system (C. Delacourt et al., Chem. Mater. 2003, 15, 5051-5058). In the face of the reservations expressed in the literature, the inventors have now discovered that by employing the process described here the iron(III) phosphate can be represented in a significantly purer form in the metastrengite II structure and also in a pH-value range which is determined solely by the phosphoric acid.

The iron(III) orthophosphate according to the invention has a platelet-shaped morphology with metastrengite II structure. This structure permits closer packing of the crystallites and particles with less exclusion volume than spherical particles. With the iron(III) orthophosphate according to the invention high bulk densities can therefore be realised, which is particularly advantageous for use in $LiFePO_4$ cathode materials. A smaller thickness of the crystal platelets ensures, for example, a fast reaction rate during production of $LiFePO_4$ as well as higher performance of the finished cathode material, since the diffusion paths and diffusion times of the Li ions can be considerably reduced in comparison with conventional material.

In one embodiment, the iron(III) orthophosphate according to the invention has, at least in one dimension, an average primary particle size of <1 µm, preferably <500 nm, particularly preferably <100 nm. Furthermore, in one preferred embodiment, the iron(III) orthophosphate according to the invention has a bulk density of >600 g/l, preferably of >800 g/l, particularly preferably of >1000 g/l.

The iron(III) orthophosphate according to the invention thus reveals a very fine primary particle size, but, nonetheless, at the same time, a very high bulk density. In comparison to the prior art, this was surprising. Iron(III) orthophosphates produced from iron sulphate or iron chloride in accordance with generally known processes normally have a primary particle size of >1 µm, whereby high bulk densities of >1000 g/l can also be realised. If these known processes based on iron sulphate or iron chloride are used to produce corresponding iron(III) orthophosphates with smaller primary particle sizes within the sub-micrometer range, then only small bulk densities of up to 400 g/l can be obtained. The reasons for this presumably lie in the particle morphology and particle size distribution which are influenced by crystal structure. The morphology of iron(III) phosphates which are produced from iron sulphate or iron chloride in accordance with generally known processes consists predominantly of spherical particles, whereas the iron(III) orthophosphate according to the invention has the afore-described morphology with a high proportion of angular, plate-shaped crystals (see FIGS. 1a and 2a).

The present invention comprises the product, iron(III) orthophosphate per se, as described herein and in the appendant claims, and also the process described herein for the production thereof, the use thereof for the production of $LiFePO_4$ cathode material for Li ion accumulators. Furthermore, the present invention comprises $LiFePO_4$ cathode material for Li ion accumulators, produced by using iron(III) orthophosphate, as described and claimed herein, and Li ion accumulators which comprise a $LiFePO_4$ cathode material of the afore-mentioned kind.

Further advantages, features and embodiments of the present invention will become apparent from the following examples which describe the present invention, but which are not intended to form limitations thereof.

Example 1

2.4 l phosphoric acid solution with a density of 1.121 g/l was heated to 92° C. and then mixed with 130 g $Fe_3O_4$ (FarbuHuzhou Huaman Chem. Ind. Co. Ltd.). The reaction mixture was stirred, and after 11 mins a colour change to grey took place, which was considered as an indication of the end of the reaction. At the previously set temperature, 35 ml 35%

$H_2O_2$ was then added in drop-wise manner over a period of 6 minutes, in order to oxidise iron(II) present in the reaction mixture into iron(III). The content of iron(II) in the reaction mixture was monitored using suitable test strips by Merck. As soon as no more iron(II) could be detected, the pink-grey coloured preparation was stirred for a further 15 mins. The colour changed to pink The product was filtered off, and dried at 150° C. at atmospheric pressure.

Moist yield: 370 g
Dry yield: 305 g
Yield in % 96.7
Bulk density: 920 g/l

Example 2

1 l phosphoric acid solution with a density of 1.133 g/l was heated to 95° C. and then mixed with 92 g freshly precipitated iron hydroxide (solid content ca. 63%). After 5 mins, a colour change to grey took place. At the previously set temperature, 22 ml 35% $H_2O_2$ was added in drop-wise manner over a period of 4 minutes. The reaction mixture was then maintained at 100° C. for another 19 mins until the colour changed to pink The product was filtered off, and dried at 150° C. at ambient pressure.

Moist yield: 214 g
Dry yield: 124 g
Yield in %: ca. 93
Bulk density: 890 g/l

Example 3

2.7 l phosphoric acid solution with a density of 1.09 g/l was heated to 90° C., and then mixed with 200 g of a filter cake of freshly precipitated iron hydroxide carbonate (solid content ca. 48%). During the portion-wise addition, the temperature increased to 96° C. After 5 mins, a colour change took place to red-grey. 20 g 35% $H_2O_2$ was then added over a period of 4 mins. The content of iron(II) was again monitored using appropriate test sticks by Merck. The deposit was then stirred for a further 15 mins, filtered and dried at 150° C. in an ambient atmosphere.

Moist yield: 193 g
Dry yield: 128 g
Yield in %: ca. 96
Bulk density: 810 g/l

What is claimed is:

1. Iron(III) orthophosphate of the general formula $FePO_4 \times nH_2O$ (n less than or equal to 2.5), said iron(III) orthophosphate being in the form of platelet shaped crystals having an average primary particle size with a thickness of less than 300 nm and at least one dimension perpendicular to the thickness having a size of less than 1 μm, the iron (III) orthophosphate having a bulk density greater than 600 g/l, a sodium content, potassium content and a sulphur content of less than 300 ppm each and wherein greater than 80 wt. % of the iron (III) orthophosphate being present in the metastrengite II crystal structure, produced by a process including reacting iron(II), iron(III) or mixed iron(II, III) compounds selected from the group consisting of hydroxides, oxides, oxidehydroxides, oxide hydrates, carbonates and hydroxidecarbonates, with phosphoric acid having a concentration in the range of 5% to 50% at a temperature within the range of 50° C. to 180° C. and for a period of time from 0.5 min. to 120 min., converting any iron(II) present after the reaction into iron (III) by addition of an oxidant, and separating solid iron(III) orthophosphate from the reaction mixture.

2. Iron(III) orthophosphate according to claim 1, wherein the reaction of the iron compounds with phosphoric acid is carried out at a temperature within the range of 60° C. to 150° C.

3. Iron(III) orthophosphate according to claim 2 wherein the reaction of the iron compounds with phosphoric acid is carried out with vigorous mixing.

4. Iron(III) orthophosphate according to claim 1 wherein the reaction of the iron compounds with phosphoric acid is carried out for a period of from 1 min to 60 minutes.

5. Iron(III) orthophosphate according to claim 1 wherein the reaction of the iron compounds with phosphoric acid is carried out at a phosphoric acid concentration within the range of 8% to 23%.

6. Iron(III) orthophosphate according to claim 1 wherein oxidation of any iron(II) which is present is carried out by the addition of an oxidant selected from the group consisting of hydrogen peroxide, air, pure oxygen and ozone.

7. Iron(III) orthophosphate according to claim 1 wherein following separation from the reaction mixture the iron(III) orthophosphate is dried at at least one of increased temperature and reduced pressure.

8. Iron(III) orthophosphate according to claim 1 having a nitrate content of less than 100 ppm.

* * * * *